United States Patent [19]

Blanke

[11] Patent Number: 4,841,765

[45] Date of Patent: Jun. 27, 1989

[54] METHOD OF LOCATING A PARTIALLY PLUGGED PORT FUEL INJECTOR USING MISFIRE MONITOR

[76] Inventor: John D. Blanke, P.O. Box 1178, Barrington, Ill. 60011

[21] Appl. No.: 146,335

[22] Filed: Jan. 21, 1988

[51] Int. Cl.[4] .......................................... G01M 15/00
[52] U.S. Cl. ................................................ 73/119 A
[58] Field of Search ........................ 73/119 A; 60/277

[56] References Cited

U.S. PATENT DOCUMENTS

| | | | |
|---|---|---|---|
| 4,015,428 | 4/1977 | Kawai | 60/277 |
| 4,030,349 | 6/1977 | Blanke et al. | 73/116 |
| 4,031,747 | 6/1977 | Blanke | 73/116 |
| 4,493,208 | 1/1985 | Grover | 73/119 A |

Primary Examiner—Stewart J. Levy
Assistant Examiner—Robert R. Raevis
Attorney, Agent, or Firm—Neuman, Williams, Anderson & Olson

[57] ABSTRACT

A method of locating a partially plugged port fuel injector in an internal combustion engine using a misfire monitor is disclosed. In the preferred embodiment, the misfire monitor includes an oxygen analyzer for determining that the lean-roll frequency of the engine has decreased or ceased when the partially plugged fuel injector is disabled or when the cylinders associated with the partially plugged fuel injector are disabled.

10 Claims, 2 Drawing Sheets

METHOD OF LOCATING A PARTIALLY PLUGGED PORT FUEL INJECTOR USING MISFIRE MONITOR

BACKGROUND OF THE INVENTION

Among the changes in automotive technology in the 1980s has been the gradual displacement of the carburetor by fuel injectors. The traditional carburetor produced the fuel-and-air mixture needed for engine operation. In the carburetor, the fuel is dispersed in the form of tiny droplets in a stream of air. As a result of the heat absorbed on the way to the cylinder, these fuel droplets become vaporized, and the mixture thereby becomes an inflammable gas. The fuel-and-air mixture thus formed enters the combustion chamber of the cylinder, and is consumed on the power stroke.

In a fuel injected engine, fuel is injected directly into the combustion chamber of the cylinder. The injection nozzle or orifice must therefore be designed to atomize the fuel prior to its injection into the cylinder, so that complete combustion of the fuel can take place. As a fuel injected engine is operated, impurities contained in the fuel, such as varnish, dirt and other small particles, can build up in the nozzle or orifice that atomizes the fuel. When such build up occurs, the fuel injector can become partially plugged, and the fuel injector may occasionally fail to deliver the quantity of fuel required for combustion. As a result of the failed combustion due to lack of sufficient fuel, the cylinder misfires. Such an intermittent cylinder misfire or "lean-roll" condition causes the composition of the gases in the exhaust manifold to differ from those present when no misfire or lean-roll occurs. In particular, the amount of hydrocarbons (HC), carbon monoxide (CO) and oxygen ($O_2$) in the exhaust manifold gas stream will change in comparison to when complete combustion occurs.

In vehicles equipped with catalytic converters, the detection of the lean-roll misfire condition is more complicated than for vehicles without such converters. When the catalytic converter is functioning properly, it oxidizes essentially all of the HC and CO exiting the cylinders to carbon dioxide ($CO_2$) and water vapor. The concentrations of HC and CO in the exhaust gas stream exiting the catalytic converter (and also the tailpipe) are so low that they cannot be measured accurately with existing HC/CO analyzers. Likewise, during intermittent misfire or lean-roll resulting from, for example, a partially plugged port fuel injector, HC and CO will not appear in the exhaust gases exiting the catalytic converter, and conventional HC/CO analyzers lose their value as diagnostic tools for locating such partially plugged port fuel injectors.

The lean-roll phenomenon associated with fuel injector plugging can best be understood with reference to FIG. 1. In a typical engine 10 having cylinders 12a-f, port fuel injectors 14a-f, respectively, are connected to their corresponding cylinders. Fuel is fed to fuel injectors 14a-f by fuel line 16, the open end of which in FIG. 1 is connected to the fuel pump (not shown). Air is fed to fuel injectors 14a-f by air line 15, the open end of which is connected to the air filter (not shown). Exhaust gas stream 18 exiting cylinders 12a-f is carried to catalytic converter 20 in exhaust manifold 26. Exhaust gas stream 24 exiting catalytic converter 20 is released from the vehicle to the atmosphere by tailpipe 22.

As stated earlier, the partial plugging of any of fuel injectors 14a-f will cause its corresponding cylinder 12a-f to intermittently misfire. This is called the lean-roll misfire condition. Lean-roll can occur when cylinders 12a-f misfire individually or simultaneously, as partial plugging may exist in one or more of fuel injectors 14a-f. The present invention provides a method by which such partially plugged port fuel injectors can be located. Once located, the partially plugged fuel injectors can be cleaned or replaced, and the lean-roll misfire condition thereby eliminated.

In the preferred embodiment of the present invention, the apparatus used to detect the lean-roll condition is the MIXWHIZ TM MISFIRE MONITOR sold by Blanke Industries Inc., P.O. Box 1178, Barrington, Ill. 60010. The operation of the MIXWHIZ TM MISFIRE MONITOR is described in U.S. Pat. No. 4,030,349 entitled "IMPROVED ENGINE ANALYSIS APPARATUS" filed in the name of John D. Blanke et al. and U.S. Pat. No. 4,031,747 entitled MISFIRE MONITOR FOR ENGINE ANALYSIS HAVING AUTOMATIC RESCALING filed in the name of John D. Blanke, both patents of which are incorporated herein by reference in their entireties. In the Blanke et al. '349 patent, a misfire monitor is described which is capable of detecting lean-roll in an internal combustion engine by comparing the rate of change of oxygen in the exhaust gases with respect to time (dO/dt) against a limit. In the Blanke '747 patent, a misfire monitor is described which is capable of automatically adjusting the parameters used in the testing for a lean-roll condition to a standard range whereby the misfire monitor can be used on various engine types with little or no operator intervention.

It has been found that an oxygen analyzer like the MIXWHIZ TM MISFIRE MONITOR is more suitable than an HC/CO analyzer for detecting intermittent misfires or lean-roll because the concentration of uncombusted oxygen, unlike uncombusted HC and CO, is not affected by the catalytic converter. Thus, oxygen is available for analysis at the tailpipe whether or not the vehicle is equipped with a catalytic converter. As described in the '349 and '747 patents, the MIXWHIZ TM MISFIRE MONITOR is a very fast oxygen analyzer which employs a sensor and associated electronics to detect intermittent changes in oxygen concentration. When a misfire occurs, the oxygen in the exhaust gas stream quickly increases and then decreases to a steady state oxygen level. This spike of oxygen in the exhaust gas stream lasts only for a fraction of a second. The oxygen spike produced by the misfire triggers the sensor and electronic circuitry of the MIXWHIZ TM MISFIRE MONITOR to actuate an alarm. Another major circuit of the misfire monitor converts the oxygen sensor output into a direct readout of oxygen in the tailpipe, thus allowing precise adjustment of fuel-to-air ratios.

In the case of a partially plugged port fuel injector, the plugging causes the cylinder to fail to ignite because of inadequate fuel or leanness. As a result of the misfire, the slug of oxygen from the unignited cylinder causes the exhaust oxygen to rapidly increase and then come back down when the cylinder associated with the partially plugged fuel injector fires on the next power stroke. The MIXWHIZ TM MISFIRE MONITOR detects this misfire and any other bursts of oxygen caused by later misfires. Whenever the MIXWHIZ TM MISFIRE MONITOR detects an oxygen spike, it signals an alarm by, for example, the beep of a horn, to let the user know that a misfire has occurred.

The present invention is directed to the difficulties inherent in locating partially plugged port fuel injectors in internal combustion engines. As stated earlier, the existing HC/CO analyzers are ill-suited for locating such partially plugged port fuel injectors because of their inability to detect a lean-roll condition in view of the near-complete consumption of HC and CO by the catalytic converter. Moreover, the apparatus and methods described in the '349 and '747 patents are directed to carburetor-based engines and do not describe or suggest the use of a misfire monitor or oxygen analyzer with fuel injected engines, much less to locate partially plugged fuel injectors.

OBJECTS OF THE INVENTION

It is an object of this invention to provide a method of locating a partially plugged port fuel injector in an internal combustion engine using a misfire monitor.

It is another object of this invention to provide a method of using a misfire monitor to locate which, if any, of a series of fuel injectors is partially plugged.

SUMMARY OF THE INVENTION

The above and other objects are accomplished in accordance with this invention by providing a method of locating a partially plugged port fuel injector in an internal combustion engine using a misfire monitor to determine that the misfire frequency of the engine has decreased or ceased when the partially plugged port fuel injector is disabled. In the preferred embodiment of the invention, the misfire monitor includes an oxygen analyzer which signals the occurrence of a lean-roll condition.

In another embodiment of the invention, a method of using a misfire monitor to locate partially plugged port fuel injectors in an internal combustion engine is provided, comprising the steps of:

a. sampling the exhaust gases from the engine to determine that a lean-roll condition exists;

b. disabling one fuel injector;

c. sampling the exhaust gases from the engine to determine the lean-roll frequency of the engine;

d. noting the location of the fuel injector if the lean-roll frequency of the engine has decreased or ceased;

e. reenabling the fuel injector;

f. repeating steps (b) through (e) for each fuel injector.

In still another embodiment of the invention, a method of locating a partially plugged port fuel injector in an internal combustion engine is provided wherein the misfire monitor is used to determine that the lean-roll frequency of the engine has decreased or ceased when the cylinders associated with the partially plugged fuel injector are disabled.

DESCRIPTION OF THE PREFERRED EMBODIMENT

Figures 1, 2:
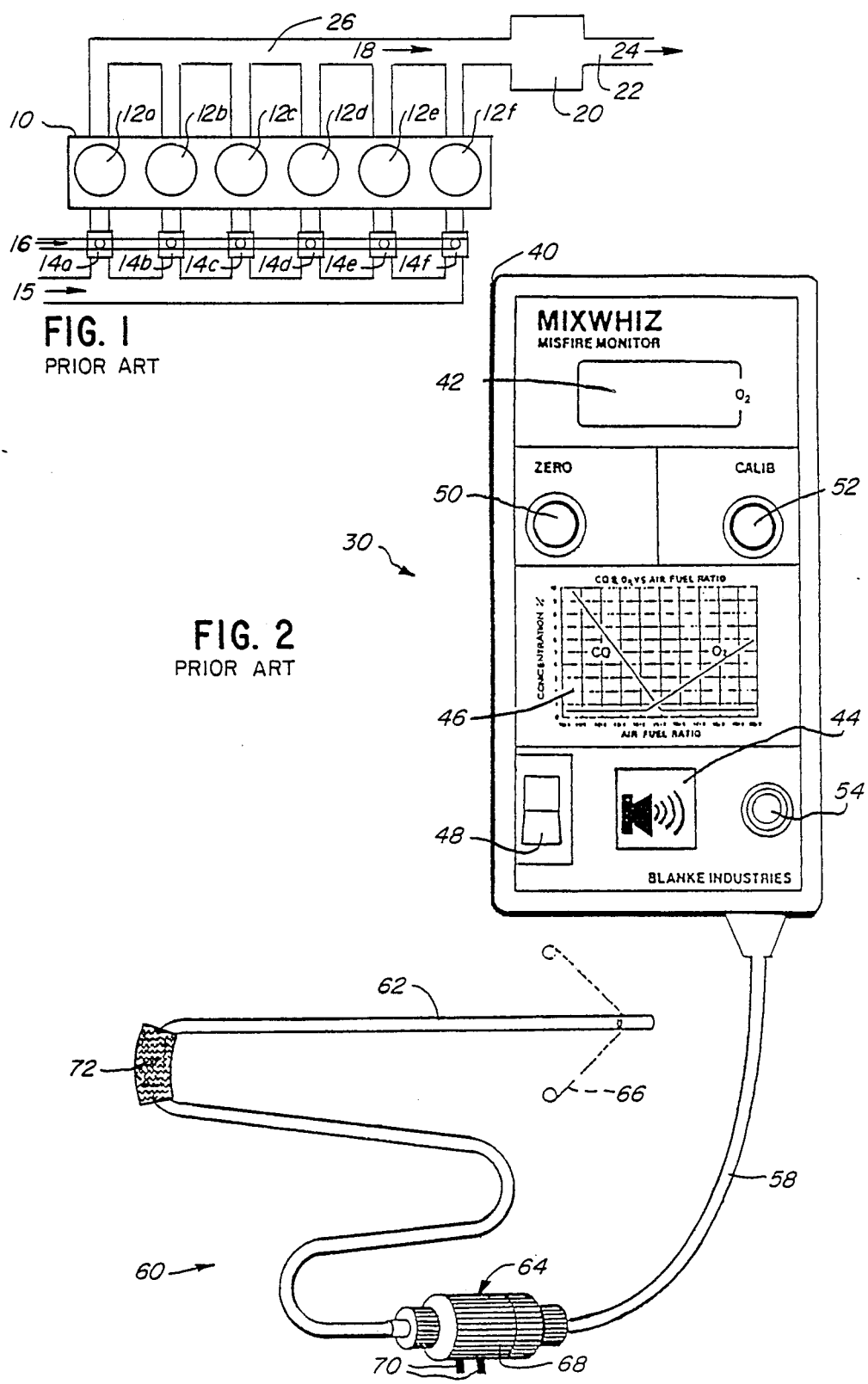
FIG. 1 is a simplified top view of an internal combustion engine showing the cylinders and associated fuel injectors, as well as the fuel line feeding the fuel injectors, the exhaust gas streams, and the catalytic converter.
FIG. 2 is an illustration of the MIXWHIZ TM MISFIRE MONITOR, including an oxygen analyzer and probe/sensor assembly, which is used in the present invention to detect a lean-roll misfire condition.

Turning first to FIG. 1 of the drawings, a typical engine 10 having cylinders 12$a$–$f$ is illustrated in simplified form. Port fuel injectors 14$a$–$f$ are connected to cylinders 12$a$–$f$, respectively. Fuel line 16 supplies fuel to fuel injectors 14$a$–$f$. The fuel in line 16 is typically maintained under pressure by a fuel pump (not shown). Air line 15 supplies air to fuel injectors 14$a$–$f$. After combustion during the power stroke, exhaust gases exit cylinders 12$a$–$f$ as exhaust gas stream 18. Hydrocarbons (HC) and carbon monoxide (CO) present in exhaust gas stream 18 are converted to carbon dioxide ($CO_2$) and water vapor by catalytic converter 20. Converted exhaust gas stream 24 exits catalytic converter 20 via tailpipe 22, and is expelled to the atmosphere. If catalytic converter 20 is working properly, the concentrations of HC and CO in converted exhaust gas stream 24 should be negligible or zero. Because catalytic converter 20 consumes only a small amount of oxygen in converting HC and CO to $CO_2$ and water vapor, the concentration of oxygen in exhaust gas stream 18 should be just marginally higher than the concentration of oxygen in converted exhaust gas stream 24. The key point, of course, is the availability of oxygen in exhaust gas stream 24 for use in detecting misfires.

Referring now to FIG. 2, a MIXWHIZ TM MISFIRE MONITOR is illustrated generally as misfire monitor 30. Misfire monitor 30 includes hand-held oxygen analyzer 40 and probe/sensor assembly 60. Analyzer 40 is electrically connected to probe/sensor assembly 60 by cable 58. Analyzer 40 includes a liquid crystal display 42, which provides a direct readout of percent oxygen, and can be used to set the precise fuel-to-air ratio in the engine. Of course, other suitable displays could be substituted for liquid crystal display 42.

With respect to the present invention, analyzer 40 includes an internal horn 44 to signal intermittent misfires or lean-roll conditions. The horn is designed to be heard above engine noise, but not to be a distraction to others working in the area. Of course, other appropriate signal means could be substituted for horn 44, such as an alarm light. Analyzer 40 also includes a reference graph 46, which plots the concentrations of carbon monoxide (CO) and oxygen ($O_2$) versus air-fuel ratio for use in conjunction with adjusting the fuel-to-air ratio.

As shown in FIG. 2, analyzer 40 includes four controls: on/off switch 48, zero knob 50, calibration knob 52 and zero button 54. On/off switch 48 activates misfire monitor 30. Zero knob 50 is used to set display 42 to 0.0% oxygen when zero button 54 is depressed. Calibration knob 52 is used to calibrate analyzer 40 to 21.0% oxygen when probe/sensor assembly 60 is in air.

Referring again to FIG. 2, probe/sensor assembly 60 includes tubular exhaust probe 62, which samples exhaust gases from the tailpipe and carries them the length of probe 62 to oxygen sensor assembly 64. As shown in FIG. 2, spring clip 66 attached to the tailpipe end of probe 62 secures probe 62 within the tailpipe during misfire monitoring. Sensor assembly 64 includes sensor holder 68, which is preferably constructed of durable plastic or the like. Sensor holder 68 is equipped with exhaust/water vents 70, which project downward from sensor holder 68. Sensor assembly 64 also includes an oxygen sensor (not shown) located within sensor holder 68, which can be replaced by the user when the oxygen sensor becomes exhausted (typically after one to two years of continuous use).

In addition to carrying the sampled exhaust gases from the tailpipe to sensor assembly 64, probe 62 also cools the exhaust gases. Water that condenses in probe 62 is drained from sensor holder 68 by exhaust/water vents 70. Exhaust gases which flow through sensor assembly 64 are analyzed for oxygen concentration by the oxygen sensor (not shown) located inside sensor holder 68. Exhaust gases exit probe/sensor assembly 60 through exhaust/water vents 70.

As shown in FIG. 2, probe 62 includes a heat-resistant grip 72. Extreme care must be employed when handling probe/sensor assembly 60 because the temperature of probe 62 can exceed 350° F. after being in a tailpipe. Users of misfire monitor 30 should therefore always handle probe 62 using grip 72 so as to avoid burns from touching skin to hot metal.

Before misfire monitor 30 can be used to locate a partially plugged fuel injector, analyzer 40 must be calibrated. To calibrate analyzer 40, the following calibration procedure is suggested:

1. Turn analyzer 40 on using on/off switch 48, and allow analyzer 40 to stabilize for approximately thirty seconds;
2. Keep probe 62 and sensor assembly 64 in air, not in the tailpipe;
3. Depress zero button 54 and hold it down;
4. While holding down zero button 54, adjust zero knob 50 so that display 42 reads 0.0% oxygen;
5. Release zero button 54;
6. With probe 62 and sensor assembly 64 still in air, adjust calibration knob 52 so that display 42 reads 21.0% oxygen.

The preferred method of locating partially plugged port fuel injectors using misfire monitor 40 will be described with reference to FIG. 3. The preferred method starts at step 80. Preliminarily, however, before a partially plugged fuel injector can be located using misfire monitor 30, any air inject system into the exhaust manifold and/or catalytic converter must be disengaged so that no outside air enters exhaust gas streams 18 or 24 shown in FIG. 1. In addition, the engine speed should be set to the idle RPMs (revolutions per minute) recommended by the vehicle manufacturer.

Figure 3:
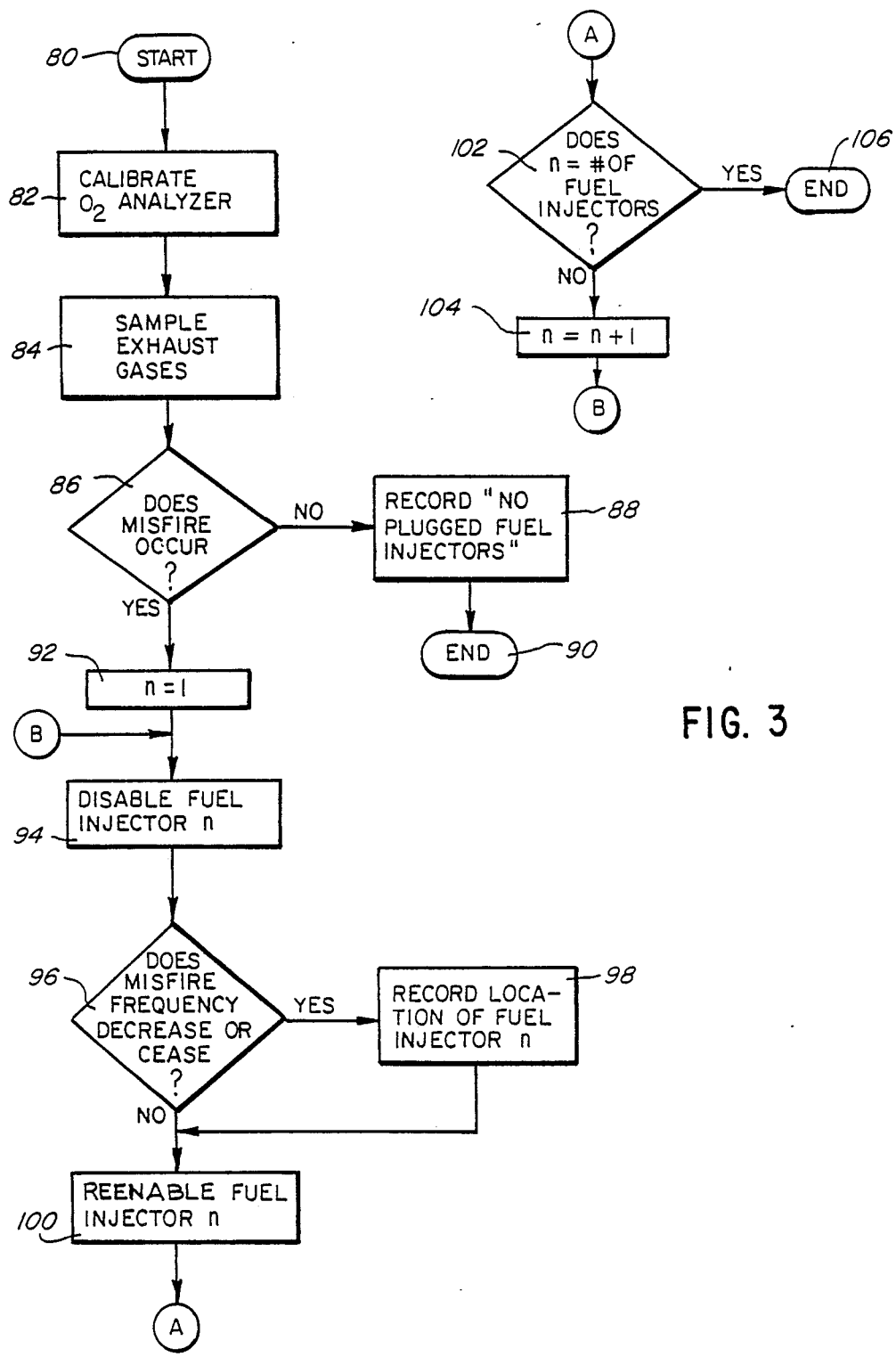
FIG. 3 is a flow diagram of the preferred embodiment of the present invention, illustrating a method of locating a partially plugged port fuel injector using the misfire monitor illustrated in FIG. 2.

After disengaging any air inject system and setting the idle RPMs, the next step, as shown in step 82 of FIG. 3, is to calibrate oxygen analyzer 40 using the calibration procedure suggested above. Next, probe 62 is placed fully within the vehicle tailpipe. If the oxygen concentration displayed on display 42 is high, say 2.5% or above, oxygen is leaking into the exhaust gas stream through a tailpipe leak or air inject system. This leak must be cured before continuing with the method to locate a partially plugged fuel injector.

As shown in step 86 of FIG. 3, if a lean-roll condition does not exist, then horn 44 will not sound, and the user can thereby conclude that no plugged fuel injectors are present, and record his conclusion as shown in step 88 of FIG. 3. In such case, the method ends as shown in step 90.

If a lean-roll condition exists, then horn 44 will sound, and the user should proceed to step 92 in FIG. 3 to locate the partially plugged port fuel injector(s) causing the lean-roll condition. As shown in step 94, each fuel injector is disabled one at a time, and the occurrence of a lean-roll is again indicated by the sound of the horn 44 (not shown in FIG. 3) in step 96. The fuel injectors can be disabled by various known means, including interrupting the electrical current supplying the fuel injector such as by disconnecting the electrical wire leading to the fuel injector, interrupting the supply of fuel to the fuel injector such as by disconnecting the fuel line leading to the fuel injector, and other like means.

When the lean-roll frequency decreases or if the lean-roll condition stops altogether in step 96, horn 44 will sound less frequently or not sound at all. Horn 44 sounds less frequently or not at all because disabling the fuel injectors converts intermittent misfires (which activate the misfire monitor alarm, horn 44) to continuous misfires (which silence the misfire monitor alarm, horn 44). In such instances, the user should record the location of the fuel injector as shown in step 98 and reenable the fuel injector as shown in step 100. A decrease in the lean-roll frequency (signalled by horn 44 sounding less frequently) indicates that one or more fuel injectors in addition to the fuel injector under test is partially plugged. A cessation in the lean-roll frequency (i.e., horn 44 does not sound at all) indicates that the fuel injector under test is the only partially plugged fuel injector in the engine. After determining whether all fuel injectors have been tested (step 102), the user repeats steps 94–102 for the remaining untested fuel injectors. When all fuel injectors have been tested, the method ends at step 106, and the partially plugged fuel injectors located and recorded in step 98 should be cleaned or replaced.

In another embodiment of the invention, misfire monitor 30 is used to locate a partially plugged port fuel injector by disabling the respective cylinders associated with each port fuel injector. In this alternate embodiment, steps 94 and 100 of FIG. 3 are modified. In modified step 94, instead of disabling each individual fuel injector, the cylinder or cylinders associated with each fuel injector is disabled. Disabling the cylinders is accomplished by interrupting the electrical current to the spark plug such as by disconnecting the wire leading to the spark plug, or by using a cylinder power balance apparatus to disengage the electrical current supplied to each spark plug at the distributor, or similar means. In modified step 100, the cylinder or cylinders associated with the fuel injector under test are reenabled, and modified steps 94–102 are repeated using the cylinders associated with the remaining fuel injectors. The principle of operation of this alternative embodiment is essentially the same as for the preferred embodiment described earlier. Both involve the selective disengagement of that portion of the engine associated with the partially plugged fuel injector, so that intermittent misfires (which actuate the misfire monitor alarm) are converted to continuous misfires (which silence the misfire monitor alarm).

The above-described embodiments of the present invention can be used to locate partially plugged fuel injectors in both diesel and spark-ignited engines, as well as any engine in which a misfire caused by inadequate fuel delivery to the combustion chamber produces a sudden burst of oxygen in the exhaust gas stream.

While particular embodiments and applications of the present invention have been shown, it will be understood, of course, that the invention is not limited thereto in view of the modifications which may be made thereto by those skilled in the art, particularly in light of the foregoing teachings. It is therefore contemplated by the appended claims to cover any such modifications as incorporate those features which come within the true spirit and scope of the invention.

What is claimed is:

1. The method of locating a partially plugged port fuel injector in an internal combustion engine comprising using a misfire monitor to determine that the lean-roll frequency of the engine has decreased or ceased after the partially plugged port fuel injector is intentionally disabled.

2. The method of claim 1 wherein said misfire monitor includes an oxygen analyzer which signals that a lean-roll condition has occurred.

3. The method of claim 1 wherein the fuel injector is disabled by interrupting the electrical current supplied to the fuel injector.

4. The method of claim 1 wherein the fuel injector is disabled by interrupting the supply of fuel to the fuel injector.

5. The method of using a misfire monitor to locate a partially plugged port fuel injector in an internal combustion engine comprising the steps of:
   a. sampling the exhaust gases from the engine to determine that a lean-roll condition exists;
   b. disabling one fuel injector;
   c. sampling the exhaust gases from the engine to determine the lean-roll frequency of the engine;
   d. noting the location of the disabled fuel injector if the lean-roll frequency of the engine has decreased or ceased;
   e. reenabling the disabled fuel injector;
   f. repeating steps (b) through (e) for each remaining fuel injector.

6. The method of claim 5 wherein the misfire monitor includes an oxygen analyzer which signals that a lean-roll condition has occurred.

7. The method of claim 5 wherein said one fuel injector is disabled by interrupting the electrical current supplied to said one fuel injector.

8. The method of claim 5 wherein said one fuel injector is disabled by interrupting the supply of fuel to said one fuel injector.

9. The method of locating a partially plugged port fuel injector in an internal combustion engine comprising using a misfire monitor to determine that the lean-roll frequency has decreased or ceased after the cylinder associated with the partially plugged port fuel injector is disabled.

10. The method of claim 9 wherein each one of a plurality of cylinders includes an associated spark plug, and each one of said cylinders is disabled by interrupting the electrical current to its associated said spark plug.

* * * * *